(12) United States Patent
Chang

(10) Patent No.: US 6,992,756 B1
(45) Date of Patent: Jan. 31, 2006

(54) APPARATUS AND METHOD FOR MOVEMENT MEASUREMENT AND POSITION TRACKING OF LONG, NON-TEXTURED METAL OBJECTS AT AN ELEVATED TEMPERATURE

(75) Inventor: Tzyy-Shuh Chang, Ann Arbor, MI (US)

(73) Assignee: OG Technologies, Inc., Ann Arbor, MI (US)

( * ) Notice: Subject to any disclaimer, the term of this patent is extended or adjusted under 35 U.S.C. 154(b) by 67 days.

(21) Appl. No.: 10/689,404

(22) Filed: Oct. 20, 2003

Related U.S. Application Data

(60) Provisional application No. 60/420,089, filed on Oct. 21, 2002.

(51) Int. Cl.
*G01P 3/36* (2006.01)

(52) U.S. Cl. .......................... 356/28; 356/62; 356/620

(58) Field of Classification Search ................... 356/28, 356/620, 622; 382/103, 107, 141
See application file for complete search history.

(56) References Cited

U.S. PATENT DOCUMENTS

| | | | |
|---|---|---|---|
| 5,033,096 A * | 7/1991 | Morrison et al. | 382/152 |
| 6,298,310 B1 * | 10/2001 | Kawano et al. | 702/136 |
| 6,385,556 B1 * | 5/2002 | Kawano et al. | 702/155 |
| 6,412,322 B1 * | 7/2002 | Hyakutake et al. | 72/11.5 |
| 6,530,418 B2 * | 3/2003 | Ebisu et al. | 164/502 |
| 6,744,512 B2 * | 6/2004 | Takahashi | 356/401 |

OTHER PUBLICATIONS

HATEBUR Metalforming Equipment Ltd, ESA 60 and ESA 600, <<http://www.girard.cc/hatebur/prdoucts/hotmatics/AMP20_30/esa/esa.php3>>, 1 page.*

* cited by examiner

*Primary Examiner*—Thomas H. Tarcza
*Assistant Examiner*—Isam Alsomiri

(57) ABSTRACT

A motion detection system, and more particularly, a non-contact, movement-measurement and position-tracking device, and a method of applying the device on long, non-textured or regularly textured metal objects at an elevated temperature are invented. The invention takes advantage of the oxidation marks, also known as scale, on the surface of the metal object to track the motion. The oxidation marks are typically random and irregular, providing a means for pattern tracking using imaging technologies.

9 Claims, 3 Drawing Sheets

TPL#N in IMG#N

Pattern of TPL#N, as identified in IMG#(N+1)

APPARATUS AND METHOD FOR MOVEMENT MEASUREMENT AND POSITION TRACKING OF LONG, NON-TEXTURED METAL OBJECTS AT AN ELEVATED TEMPERATURE

RELATED APPLICATIONS

This application claims the benefit of U.S. provisional application Ser. No. 60/420,089 filed Oct. 21, 2002, herein incorporated by reference in its entirety.

BACKGROUND OF THE INVENTION

1. Technical Field

The present invention relates generally to a motion detection system, and more particularly, to a non-contact, movement-measurement and position-tracking device and to a method of applying the device on long, non-textured or regularly textured metal objects at an elevated temperature.

2. Description of the Related Art

Vision systems have been used to provide non-contact movement measurement and position tracking for small objects, such as a baseball or a pin-pong ball, and for textured long objects, such as a cloth web with printed pattern. In these applications, specific patterns (color or optical geometry) are used to identify the position of the object or the movement (both in quantity and direction) of the object. Such specific patterns must be unique in a specific area of the field of view of the vision systems.

However, for a long, non-textured (or regularly textured) object, such as a long steel bar or a long steel sheet/strip, vision systems have no unique patterns to track. The patterns on a "regularly textured" object cannot provide the uniqueness for the purpose of identifying (tracking) the same point on the object.

In a steel mill or a forging shop, it is often necessary to track a long metal object, such as a hot-rolled steel rod, with accuracy. One such application is to measure the feed length of a steel rod as such rod is at an elevated temperature when the rod is fed into a forging press and cut/sheared into short segments of a specific length. While painted features may be added to the object in some applications, it is impossible to do so on a hot steel surface because no non-destructive marking material exists for hot surfaces.

One of the present arts is to use a contact wheel or a contact slide. Such device has a contact head that is engaged with the hot metal rod and move along with the hot metal rod. There is a measurement device, such as a resolver, an encoder, a linear scale, or the like integrated in the device. There are drawbacks in this approach. The contact head may wear and thus induce significant deviations in accuracy over time. The contacting device needs intensive cooling to prevent overheating. The contacting device needs perfect alignment to the motion of the hot metal rod in order to provide accurate measurements. The contacting device occupies valuable space in the hot metal working equipment. Installation of the contacting device requires a significant period of down time of the hot metal working equipment.

Another approach is dead reckoning. In this approach, the starting end of the metal rod is detected while the metal rod is still at room temperature. As the metal rod moves through the heating elements, a motion estimator, either based on time (and assumed moving speed) or based on the number of strokes (and the nominal feed length per stroke), is used to estimate how much the metal rod has moved. This approach is not accurate. There could be very significant accumulated errors in the measurement due to variation in moving speed and feed length.

The present invention is to provide a means and a method to measure and track the motion of a long, non-textured metal object at an elevated temperature that is non-contact and accurate.

SUMMARY OF THE INVENTION

The present invention proposes to utilize the marks created by the formation of scale, item 4 in FIG. 1, (surface oxidation spots on hot metal objects) as the basis for the imaging-based motion measurement and tracking. The scale marks 4 are useful in the present invention because the scale marks are always on the hot metal object surfaces, are typically random, and are typically discernable with a commonly known image processing techniques such as pattern match or geometrical search, either gray-scale based or contour-based.

To measure the motion, an imaging system, which consists of a camera, a lens, and a processing unit (items 6, 8 12, respectively in FIG. 1), is used. This imaging system will work based on the Prescribed Method documented in this section hereafter.

First, this system will be fixed in the measurement frame such that a measurement reference (origin) is established.

The system will then perform the measurement/tracking function in the following way.

(1) The system will grab an image of the hot metal object, into IMG#N (item 102 in FIG. 2).

(2) A zone (Region of Interest) in IMG#N will be selected, as ROI#N (item 108 in FIG. 2), such that
  (a) This ROI has scale marks (item 106 in FIG. 2),
  (b) This ROI will be in IMG#(N+1) (item 104 in FIG. 2), the image to be captured next, and
  (c) This ROI may or may not have the same image frame coordinate as ROI#(N−1).

(3) The system will create a pattern match or geometrical search template, as TPL#N (item 108 in FIG. 2), based on the image in ROI#N.

(4) The system will then grab another image of the same hot metal object, into IMG#(N+1), after a known time delay DT#N (item 114 in FIG. 2).

(5) The system will then search for the same scale marks, as selected in IMG#N, in IMG#(N+1), based on TPL#N.

(6) Once TPL#N is identified in IMG#(N+1), as illustrated by item 110 in FIG. 2, the system can compare the position of TPL#N in IMG#(N+1) (item 110 in FIG. 2) based on the image pixel coordinate and the position of TPL#N in IMG#N (the position of ROI#N in IMG#N, as illustrated by item 108 in FIG. 2) to derive the displacement and/or rotation of the scale marks in ROI#N.

(7) The system can then report the new position and/or orientation, the displacement and/or rotation, the velocity and/or rate of rotation of the hot metal object based on the motion of the scale marks in ROI#N and the time DT#N.

(8) Make N=N+1 and go to Step (2).

Select multiple ROI#N and multiple TPL#N so that cross-referencing is possible in case a scale mark falls off.

BRIEF DESCRIPTION OF THE DRAWINGS

The present invention will now be described by way of example, with reference to the accompanying drawings as described below.

DETAILED DESCRIPTION OF A PREFERRED EMBODIMENT

Figure 1:
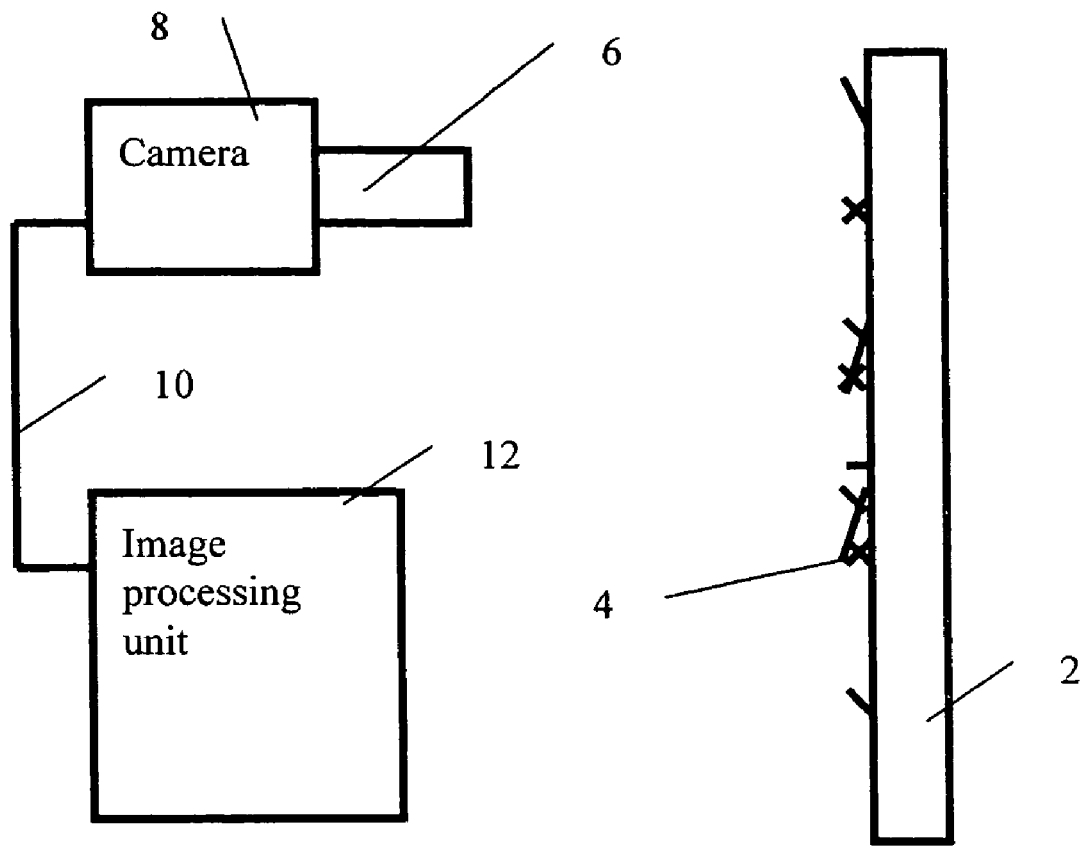
FIG. 1 is the schematic illustrating the setup of the present invention.
Figure 2:
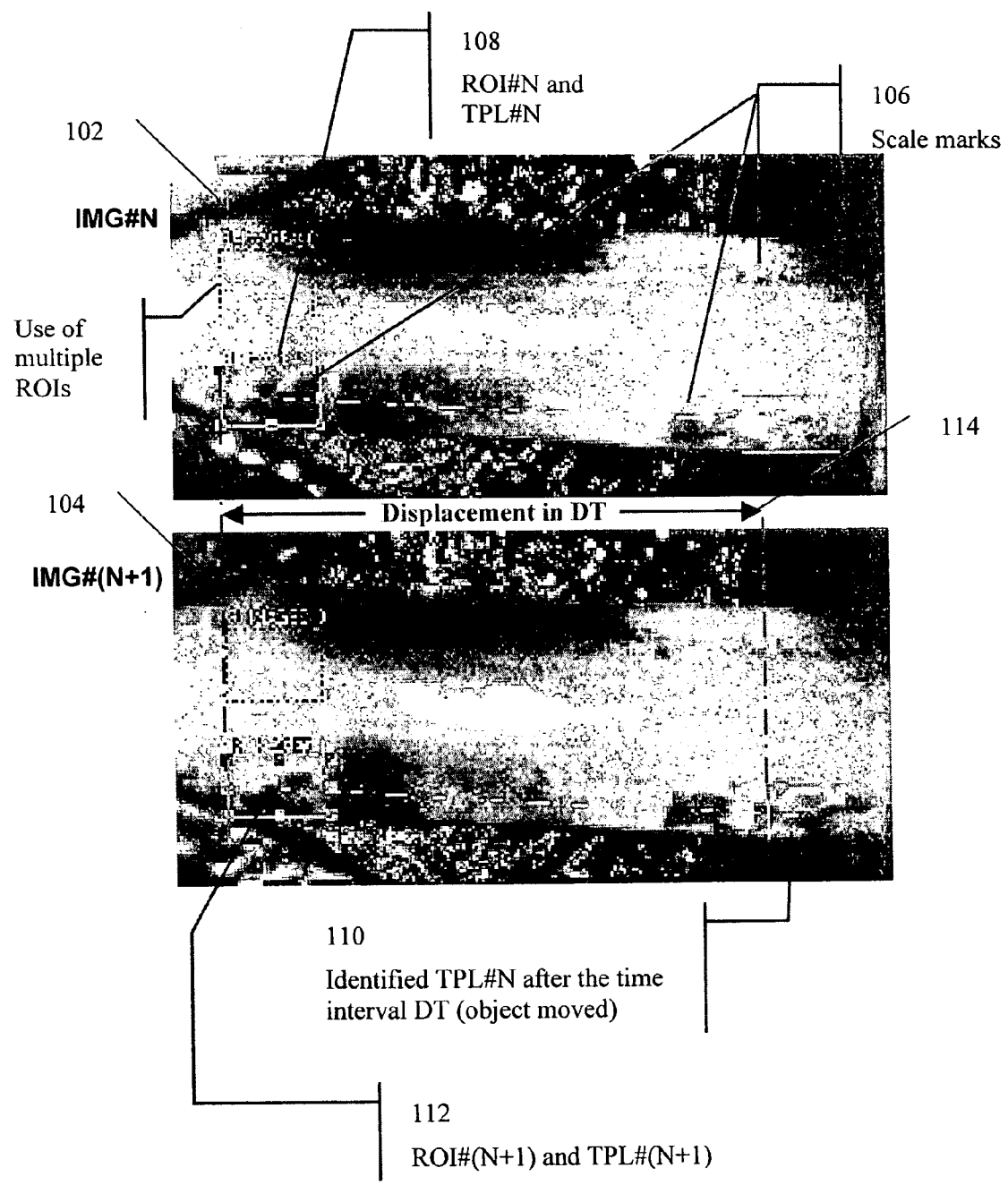
FIG. 2 is two consecutive images of the same object (a steel bar at 1,100° C.) acquired with a time difference DT in between. The images are used to illustrate the method of measuring/tracking proposed in the present invention.
Figure 3:
FIG. 3 is a zoom in view of the template, comprised of scale marks on the steel bar, in IMG#N and the identified image zone based on the template in IMG#(N+1). Both image zones have similar patterns constituted from the same scale marks.
Figure 3:

Referring now to FIG. 1 of the drawings, in one embodiment of the present invention the target or object 2 is a long, non-textured metal piece at an elevated temperature. Oxidation process will occur on the surface of this metal piece as the bulk material of this metal piece interacts with the fluid elements in the environment surrounding the metal piece such as oxygen in the air. Such oxidation process typically will not occur uniformly because of the randomness of the surface microstructure of the metal piece. Therefore, such oxidation process results in irregular, unique surface blobs typically known as scale, item 4 in FIG. 1. The image patterns of scale are as shown in FIG. 2.

Referring still to FIG. 1, such scale 4 is represented by randomly positioned and oriented short lines. The present invention utilizes the random and unique property of scale 4 to perform non-contact measurement/tracking for the long, non-textured metal piece 2. In order to capture the random and unique patterns of the scale 4, an image acquisition system, comprised of a lens 6, a camera 8 (such as a CCD camera), and an image-processing unit 12 (such as a personal computer), is used. The camera 8 is linked to the processing unit 12 through a signal channel 10. This signal channel can be wired or wireless. With the camera 8, the patterns formed by the scale marks 4 can be acquired. This image can be in analog or digital format, and can be processed in accordance of the Prescribed Method disclosed in the present invention.

Those skilled in the art will appreciate that any image capturing device, such as, but not limited to, CCD sensors, CMOS sensors, CRT image multiplexers, and so forth, can be used in the present invention.

Those skilled in the art will also appreciate that the image capturing device may not have to provide live video. A film or a sequence of images can be taken for an off-line analysis of the motion.

Those skilled in the art shall know that a clock controllable imaging device must be used if a time-dependent measurement, such as velocity, is desired.

Those skilled in the art will appreciate that multiple cameras or even multiple image processing units can be used in applications such as, but not limited to, 3D motion analysis of the target object.

Those skilled in the art will appreciate that the image-processing unit can be a personal computer that runs the software developed based on the Prescribed Method. However, the Prescribed Method can also be implemented using hardware, such as field programmable gate arrays, ASICs, DSPs, operational amplifiers, and/or other chips, or using a combination of hardware and software.

Those skilled in the art will appreciate that proper protections may be needed to prevent heat damage to the camera and the image processing unit.

Those skilled in the art will appreciate that one or more optical filters may be placed between the hot metal object and the camera for eliminating certain portion of the radiation from the object.

What is claimed is:

1. A method, the Prescribed Method, for identifying the motion of a metal object at an elevated temperature using imaging technologies based on tracking the irregular and unique surface marks on the said metal object that
    the said surface marks are formed by the oxidation process on the surface of the said metal object;
    the said tracking is accomplished by identifying the locations of the selected surface marks in different images that are taken at known different time instances;
    the said motion is identified by comparing the location differences and time differences of the selected surface marks in different images;
where, in the Prescribed Method, clocking is used for the timing of image acquisition so that time-dependent measurements including but not limited to velocity and acceleration of said metal object can be obtained.

2. The tracking method in claim 1 is gray-scale pattern match.

3. The tracking method in claim 1 is contour-based pattern match.

4. The tracking method in claim 1 is geometrical search.

5. The Prescribed Method in claim 1 is implemented in software.

6. The Prescribed Method in claim 1 is implemented in electronic hardware.

7. An optical system for movement measurement and position tracking of long, non-textured metal objects at an elevated temperature comprising:
    an image capturing device for imaging the said object;
    an image processing unit for processing the images captured from the said object;
    wherein the said image processing unit processes the images based on the Prescribed Method in claim 1.

8. An optical system as recited in claim 7, wherein the optical system includes a CCD camera.

9. An optical system as recited in claim 7, wherein the optical system includes a CMOS camera.

* * * * *